(12) United States Patent
Shelke et al.

(10) Patent No.: US 11,909,565 B2
(45) Date of Patent: Feb. 20, 2024

(54) READ EYE TRAINING

(71) Applicant: Cadence Design Systems, Inc., San Jose, CA (US)

(72) Inventors: Anirudha Shelke, Bengaluru (IN); Ashwin S. Madhavakaimal, Bangalore (IN); Kiran Baby, Bangalore (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/879,611

(22) Filed: Aug. 2, 2022

(65) Prior Publication Data

US 2023/0048896 A1 Feb. 16, 2023

Related U.S. Application Data

(60) Provisional application No. 63/231,972, filed on Aug. 11, 2021.

(51) Int. Cl.
*H04L 25/03* (2006.01)

(52) U.S. Cl.
CPC .............................. *H04L 25/03057* (2013.01)

(58) Field of Classification Search
CPC ......... H04L 25/03006; H04L 25/03019; H04L 25/03057; H04L 25/03879; H04L 25/03885
USPC ............... 375/232, 233, 257, 346, 348, 350; 708/322, 323
See application file for complete search history.

(56) References Cited

U.S. PATENT DOCUMENTS

| | | | |
|---|---|---|---|
| 8,107,522 B2 | 1/2012 | Aziz et al. | |
| 11,360,874 B2* | 6/2022 | Morris | G06F 11/3409 |
| 2009/0323794 A1 | 12/2009 | Tian et al. | |
| 2019/0116070 A1* | 4/2019 | Hollis | H04L 25/03057 |
| 2020/0382348 A1* | 12/2020 | Liu | H04L 25/03146 |
| 2021/0160106 A1* | 5/2021 | Sun | H04L 25/4917 |

OTHER PUBLICATIONS

Kim, Minchang et al., "An 8Gb/s Adaptive DFE with Level Calibration using Training Data Pattern for Mobile DRAM Interface", 2017 International SoC Design Conference (ISOCC), 2017, pp. 286-287, doi: 10.1109/ISOCC.2017.8368898. 2 pages.

* cited by examiner

*Primary Examiner* — Young T. Tse
(74) *Attorney, Agent, or Firm* — Mark H. Whittenberger; Holland & Knight LLP

(57) ABSTRACT

Decision feedback equalization (DFE) is used to help reduce inter-symbol interference (ISI) from a data signal received via a band-limited (or otherwise non-ideal) channel. In embodiment, a single-ended receiver trains DFE coefficients and the slicer reference voltage to improve the received eye height. The process for training avoids many whole range sweeps thereby shortening training time. A custom data pattern that includes low-frequency (DC with respect to DFE) and high-frequency (AC with respect to DFE) worst cases is used for training in a closed loop manner. Negative DFE is used to measure the AC height of the data. Positive DFE is used to find the DC height of the data pattern.

20 Claims, 9 Drawing Sheets

MEASURE, AT A FIRST SAMPLE TIMING AND BY VARYING A DFE COEFFICIENT OF THE RECEIVER, A FIRST EYE HEIGHT WHILE RECEIVING A FIRST DATA PATTERN
602

MEASURE, AT THE FIRST SAMPLE TIMING BY VARYING THE DFE COEFFICIENT, A SECOND EYE HEIGHT WHILE RECEIVING A SECOND DATA PATTERN
604

BASED ON THE FIRST EYE HEIGHT AND THE SECOND EYE HEIGHT, ADJUSTING THE DFE COEFFICIENT TO A FIRST SETTING.
606

*FIG. 6*

(A) FINDING A FIRST SAMPLE TIMING OF A SLICER THAT CORRESPONDS TO A FIRST EYE CENTER
702

(B) PROVIDING A FIRST DATA PATTERN AND A SECOND DATA PATTERN TO AN INPUT OF THE RECEIVER
704

(C) ITERATIVELY VARYING A REFERENCE VOLTAGE OF A SLICER AND SWEEPING A VALUE OF THE DFE COEFFICIENT TO MEASURE A PLURALITY OF FIRST EYE BOUNDARIES AND A PLURALITY OF SECOND EYE BOUNDARIES CORRESPONDING TO A PLURALITY OF REFERENCE VOLTAGE VALUES
706

(D) BASED ON THE PLURALITY OF FIRST EYE BOUNDARIES AND THE PLURALITY OF SECOND EYE BOUNDARIES, DETERMINING A REFERENCE VOLTAGE VALUE THAT MAXIMIZES A DIFFERENCE BETWEEN A CORRESPONDING FIRST EYE BOUNDARY AND SECOND EYE BOUNDARY
708

(E) WHILE THE RECEIVER IS USING THE REFERENCE VOLTAGE VALUE THAT MAXIMIZES THE DIFFERENCE BETWEEN THE CORRESPONDING FIRST EYE BOUNDARY AND SECOND EYE BOUNDARY, FINDING A SECOND SAMPLE TIMING OF THE SLICER THAT CORRESPONDS TO A SECOND EYE CENTER
710

(F) REPEATING STEPS (B) THROUGH (E) FOR A NUMBER OF ITERATIONS.
712

*FIG. 7*

READ EYE TRAINING

CROSS-REFERENCE TO RELATED APPLICATIONS

This application claims benefit to U.S. Provisional Application No. 63/231,972, filed Aug. 2, 2022, the entire of contents of which is herein incorporated by reference.

FIELD OF THE INVENTION

The present disclosure relates to circuits and more particularly, to decision feedback equalization.

DISCUSSION OF RELATED ART

Serial data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments may lead to transmission errors. The quality of a channel can determine an upper limit on its achievable rate. Additionally, other impairments in a serial data link can degrade overall system performance. For instance, circuit non-idealities can also cause a degradation in a system's performance. Overall, minimizing impairments can enable a channel to reach or achieve higher link rates.

SUMMARY OF THE INVENTION

In one or more embodiments of the present disclosure, a method of calibrating a receiver with decision feedback equalization (DFE) is provided. The method may include measuring, at a first sample timing and by varying a DFE coefficient of the receiver, a first eye height while receiving a first data pattern. The method may further include measuring, at the first sample timing by varying the DFE coefficient, a second eye height while receiving a second data pattern, and based on the first eye height and the second eye height, adjusting the DFE coefficient to a first setting.

One or more of the following features may be included. The first setting provides DFE that is a first average of the first eye height and the second eye height. The method may further include adjusting a reference voltage of a slicer from a first value used during measurements of the first eye height and the second eye height to a second value, and measuring, at the first sample timing, while using the second value, and by varying the DFE coefficient of the receiver, a third eye height while receiving the first data pattern. The method may also include measuring, at the first sample timing, while using the second value, and by varying the DFE coefficient, a fourth eye height while receiving the second data pattern, and determining whether a first difference between the first eye height and the second eye height is greater than a second difference between the third eye height and the fourth eye height. Based on the first difference being greater than the second difference, adjusting the reference voltage of the slicer to the first value. Based on the first difference being greater than the second difference, the adjusting of the DFE coefficient to a first setting adjusts the DFE coefficient to provide DFE that is an average of the first eye height and the second eye height. The first data pattern has high-frequency switching with respect to a number of DFE taps of the DFE. The second data pattern has low-frequency switching with respect to a number of DFE taps of the DFE.

In one or more embodiments of the present disclosure, a receiver circuit is provided. The circuit may include a slicer and decision feedback equalization (DFE) circuitry, the DFE circuitry having a DFE coefficient, the slicer having a reference voltage. The circuit may further include control circuitry configured to calibrate the DFE coefficient by: measuring, at a first sample timing and by varying the DFE coefficient, a first eye height while receiving a first data pattern, measuring, at the first sample timing by varying the DFE coefficient, a second eye height while receiving a second data pattern, and based on the first eye height and the second eye height, adjusting the DFE coefficient to a first setting.

One or more of the following features may be included. The first setting provides DFE equalization that is a first average of the first eye height and the second eye height. The control circuitry may be further configured to: adjust a reference voltage of the slicer from a first value used during measurements of the first eye height and the second eye height to a second value, measure, at the first sample timing, while using the second value, and by varying the DFE coefficient of the receiver circuit, a third eye height while receiving the first data pattern, and to measure, at the first sample timing, while using the second value, and by varying the DFE coefficient, a fourth eye height while receiving the second data pattern. The control circuitry may be further configured to: determine whether a first difference between the first eye height and the second eye height is greater than a second difference between the third eye height and the fourth eye height, and based on the first difference being greater than the second difference, adjust the reference voltage of the slicer to the first value. Based on the first difference being greater than the second difference, adjusting the DFE coefficient to a first setting adjusts the DFE coefficient to provide DFE that is an average of the first eye height and the second eye height. The first data pattern has high-frequency switching with respect to a number of DFE taps of the DFE. The second data pattern has low-frequency switching with respect to a number of DFE taps of the DFE.

In one or more embodiments of the present disclosure, a method of calibrating a decision feedback equalization (DFE) coefficient of a receiver is provided. The method may include finding a first sample timing of a slicer that corresponds to a first eye center, providing a first data pattern and a second data pattern to an input of the receiver, and iteratively varying a reference voltage of a slicer and sweeping a value of the DFE coefficient to measure a plurality of first eye boundaries and a plurality of second eye boundaries corresponding to a plurality of reference voltage values. The method may further include based on the plurality of first eye boundaries and the plurality of second eye boundaries, determining a reference voltage value that maximizes a difference between a corresponding first eye boundary and second eye boundary, while the receiver is using the reference voltage value that maximizes the difference between the corresponding first eye boundary and second eye boundary, finding a second sample timing of the slicer that corresponds to a second eye center, and repeating these steps for a number of iterations.

One or more of the following features may be included. The first data pattern has high-frequency switching with respect to a number of DFE taps of the DFE. The second data pattern has low-frequency switching with respect to a number of DFE taps of the DFE. The method may further include before finding the second sample timing adjusting a value of the DFE coefficient to a first setting the DFE coefficient to provide DFE that is an average of the corresponding first eye boundary and second eye boundary, and before finding the first sample timing, providing a third data pattern to the input of the receiver and finding a first value of the DFE coefficient to be used when finding the first sample timing.

BRIEF DESCRIPTION OF THE DRAWINGS

FIG. 6 is a flowchart illustrating a method of adjusting a DFE coefficient.

FIG. 7 is a flowchart illustrating a method of calibrating receiver parameters.

DETAILED DESCRIPTION OF THE EMBODIMENTS

Decision feedback equalization (DFE) is used to help reduce inter-symbol interference (ISI) from a data signal received via a band-limited (or otherwise non-ideal) channel. In embodiment, a single-ended receiver trains DFE coefficients and the slicer reference voltage to improve the received eye height. The process for training avoids many whole range sweeps thereby shortening training time. A custom data pattern that includes low-frequency (DC with respect to DFE) and high-frequency (AC with respect to DFE) worst cases is used for training in a closed loop manner. Negative DFE is used to measure the AC height of the data. Positive DFE is used to find the DC height of the data pattern.

Figure 1:
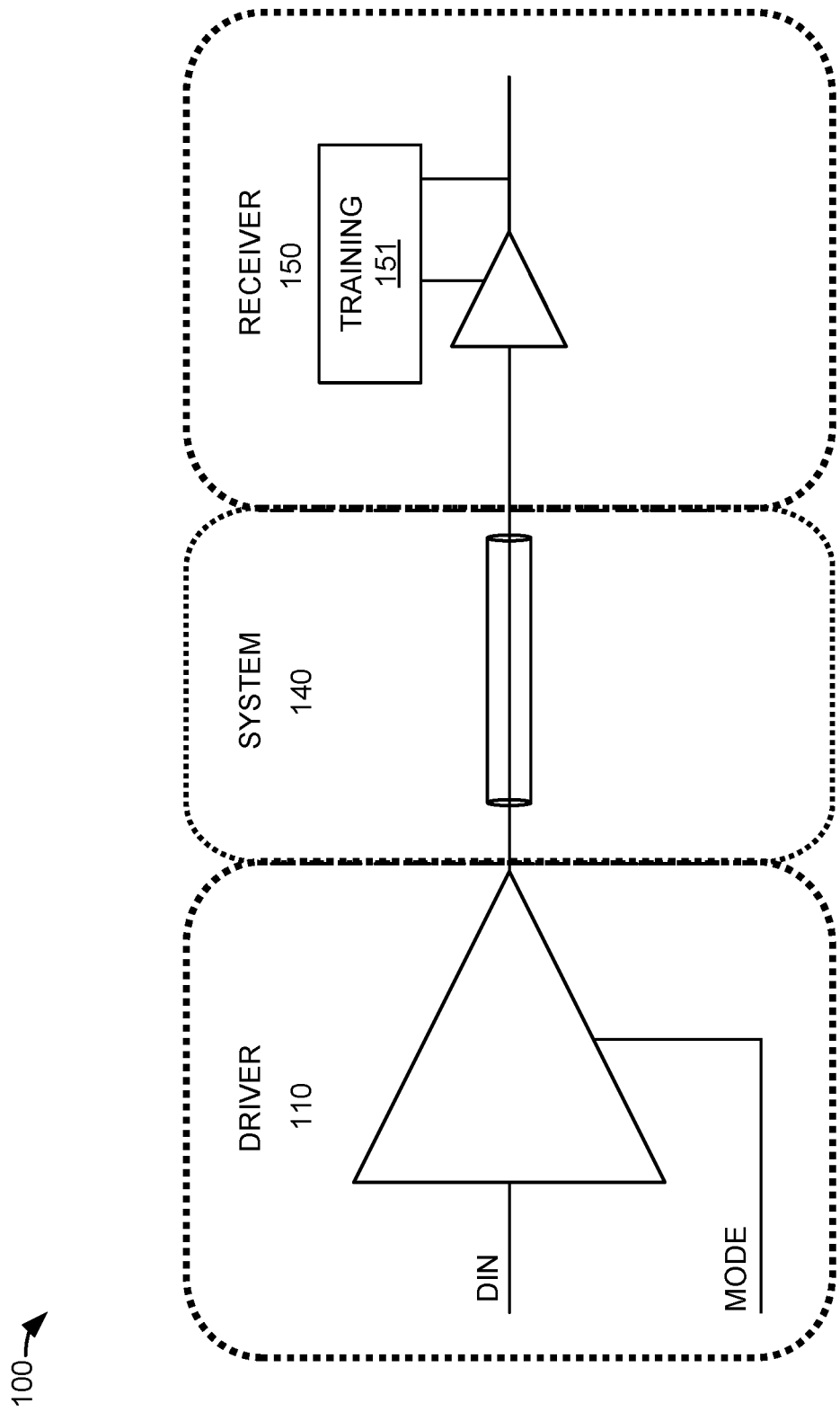
FIG. 1 is a diagram illustrating a communication system with decision feedback equalization (DFE).

FIG. 1 is a diagram illustrating a communication system with decision feedback equalization (DFE). Communication system 100 comprises a driving integrated circuit, a receiving integrated circuit, and interconnect between them. The driving integrated circuit includes driver 110 (a.k.a., a transmitter circuit).

The receiver integrated circuit includes receiver 150 and training 151. Training is operatively coupled to receiver 150 to receive the symbol decisions made by receiver 150 and to adjust one or more parameters that affect the performance and/or operation of receiver 150. The interconnect between the driving integrated circuit and the receiving integrated circuit comprises interconnect system 140. Interconnect system 140 would typically comprise a printed circuit (PC) board, connector, cable, flex circuit, other substrate, and/or a combination of these. Interconnect system 140 may be and/or include one or more transmission lines.

Receiver 150 and training 151 would typically be part of an integrated circuit that is receiving the signal sent by the driving integrated circuit. It should be understood that termination (not shown in FIG. 1) can be part of the integrated circuit or interconnect system 140.

In FIG. 1, the output of driver 110 is connected to a first end of interconnect system 140. The second end of interconnect system 140 is connected to the input of receiver 150.

In an embodiment, driver 110 may be configured to drive NRZ (non-return to zero—a.k.a. PAM-2 herein) signaling levels.

In an embodiment, receiver 150 uses a DFE architecture that has low latency from the output of the samplers to the application of the DFE tap feedback to the input signal. Appropriately weighted versions of the sampler output decisions are applied directly to the input signal without further analog or digital processing. By applying the weighted versions of the sampler outputs directly to the input signal, the latency associated with processing the sampler outputs into a DFE tap value is reduced.

Training 151 may adjust one or more parameters that affect the performance and/or operation of receiver 150. For example, training 151 may adjust a reference voltage that is used as a threshold voltage for receiver 150. Training 151 may also adjust one or more equalization coefficients (DFE coefficients). The one or more equalization coefficients may be adjusted (trained) in addition to the reference voltage with the training goal of improving the received eye pattern. In an embodiment, training 151 trains both the reference voltage and DFE coefficient(s) value to maximize eye height. Training 151 trains both the reference voltage and DFE coefficient(s) value without having to sweep all combinations of the reference voltage and DFE coefficient values.

Figure 2:
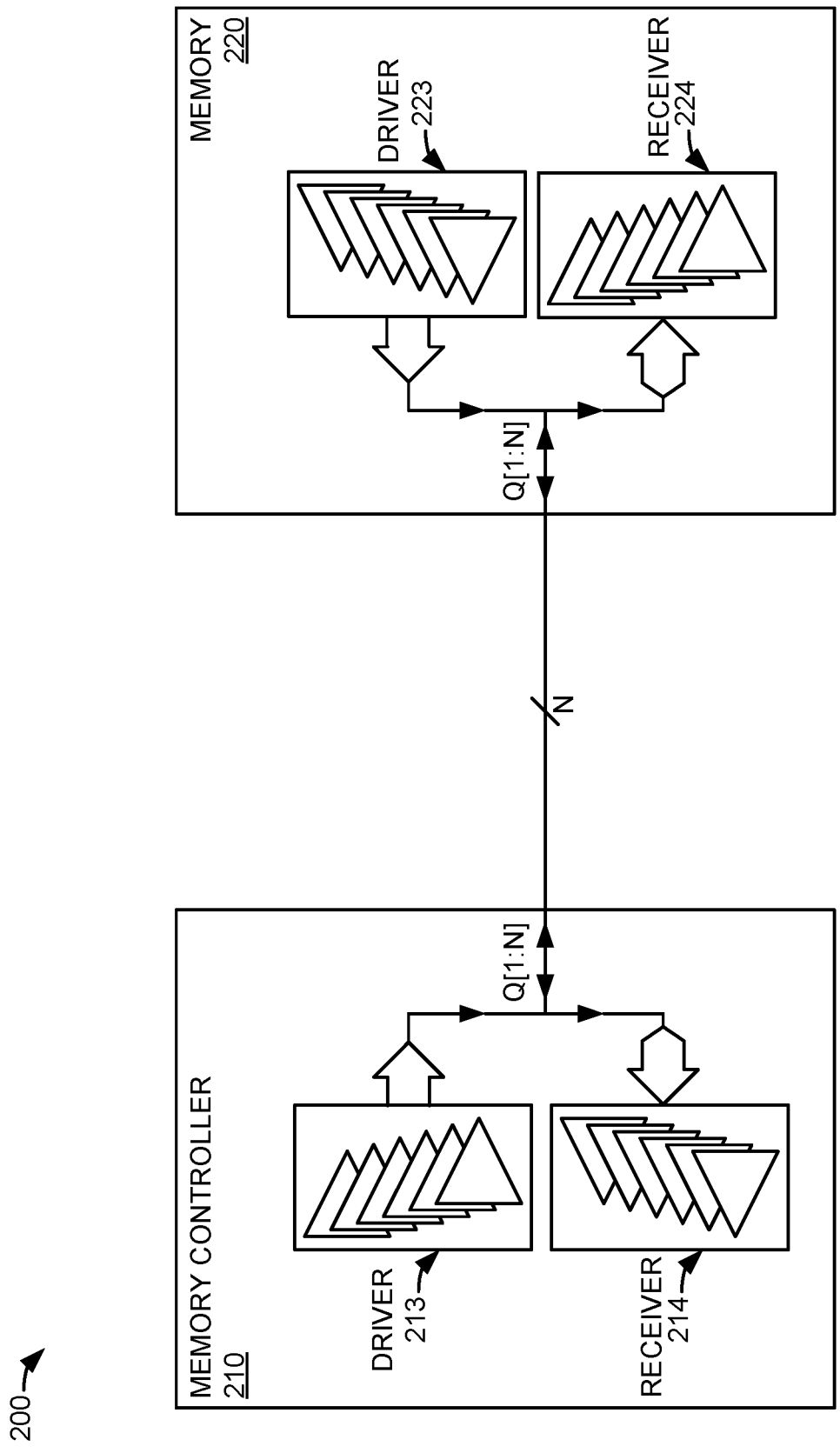
FIG. 2 is a diagram illustrating a memory system.

FIG. 2 is a block diagram illustrating a memory system. In FIG. 2, memory system 200 comprises memory controller 210 and memory 220. Memory controller 210 includes drivers 213 and receivers 214. Memory controller 210 also includes N number of signal ports Q[1:N] that may be driven by one or more of drivers 213 and may receive signals to be sampled by one or more of receivers 214. Memory 220 includes drivers 223 and receivers 224. Memory 220 also includes N number of signal ports Q[1:N] that may be driven by one or more of drivers 223 and may receive signals to be sampled by one or more of receivers 224. Signal ports Q[1:N] of memory controller 210 are operatively coupled to ports Q[1:N] of memory 220, respectively. Receivers 224 of memory 220 may receive one or more of the Q[1:N] signals from memory controller 210. Receivers 214 of memory controller 210 may receive one or more of the Q[1:N] signals from memory 220.

One or more of drivers 213 when configured and coupled with a corresponding one or more receivers 224 may form a PAM-2 signaling system. Memory controller 210 may be configured to drive, using one or more of drivers 213, data patterns to be used by memory 220 during a training operation. Thus, one or more of drivers 213 of memory controller 210 may correspond to driver 110, discussed previously, or correspond to a transmitter circuit discussed herein subsequently. One or more of receivers 214 of memory controller 210 may correspond to receiver 150, discussed previously, or correspond to a receiver circuit discussed herein subsequently. The one or more of receivers 214 of memory controller 210 may be trained using a training scheme that trains both the reference voltage and DFE coefficient(s) value to maximize eye height. The training scheme used by memory controller 210 to train receivers 214 may train both the reference voltage and DFE coefficient(s) value without having to sweep all combinations of the reference voltage and DFE coefficient values.

One or more of drivers 223 when configured and coupled with a corresponding one or more receivers 214 may form a PAM-2 signaling system. Memory 220 may be configured to drive, using one or more of drivers 223, data patterns to be used by memory controller 210 during a training operation. Thus, one or more of drivers 223 of memory controller 210 may correspond to driver 110, discussed previously, or correspond to a transmitter circuit discussed herein subsequently. One or more of receivers 224 of memory 220 may correspond to receiver 150, discussed previously, or correspond to a receiver circuit discussed herein subsequently. The one or more of receivers 224 of memory 220 may be trained using a training scheme that trains both the reference voltage and DFE coefficient(s) value to maximize eye height. The training scheme used by memory 220 to train receivers 224 may train both the reference voltage and DFE coefficient(s) value without having to sweep all combinations of the reference voltage and DFE coefficient values.

Memory controller 210 and memory 220 are integrated circuit type devices, such as one commonly referred to as a "chip". A memory controller, such as memory controller 210, manages the flow of data going to and from memory devices, such as memory 220. For example, a memory controller may be a northbridge chip, an application specific integrated circuit (ASIC) device, a graphics processor unit (GPU), a system-on-chip (SoC) or an integrated circuit device that includes many circuit blocks such as ones selected from graphics cores, processor cores, and MPEG encoder/decoders, etc. Memory 220 can include a dynamic random access memory (DRAM) core or other type of memory cores, for example, static random access memory (SRAM) cores, or non-volatile memory cores such as flash. In addition, although the embodiments presented herein describe memory controller and components, the instant apparatus and methods may also apply to chip interfaces that effectuate signaling between separate integrated circuit devices.

It should be understood that signal ports Q[1:N] of both memory controller 210 and memory 220 may correspond to any input or output pins (or balls) of memory controller 210 or memory 220 that transmit information between memory controller 210 and memory 220. For example, signal ports Q[1:N] can correspond to bidirectional data pins (or pad means) used to communicate read and write data between memory controller 210 and memory 220. The data pins may also be referred to as "DQ" pins. Thus, for a memory 220 that reads and writes data up to 16 bits at a time, signal ports Q[1:N] can be seen as corresponding to pins DQ[0:15]. In another example, signal ports Q[1:N] can correspond to one or more unidirectional command/address (C/A) bus. Signal ports Q[1:N] can correspond to one or more unidirectional control pins. Thus, signal ports Q[1:N] on memory controller 210 and memory 220 may correspond to pins such as CS (chip select), a command interface that includes timing control signals such as RAS and CAS, address pins A[0:P] (i.e., address pins carrying address bits), DQ[0:X] (i.e., data pins carrying data bits), etc., and other pins in past, present, or future devices.

Figure 3:
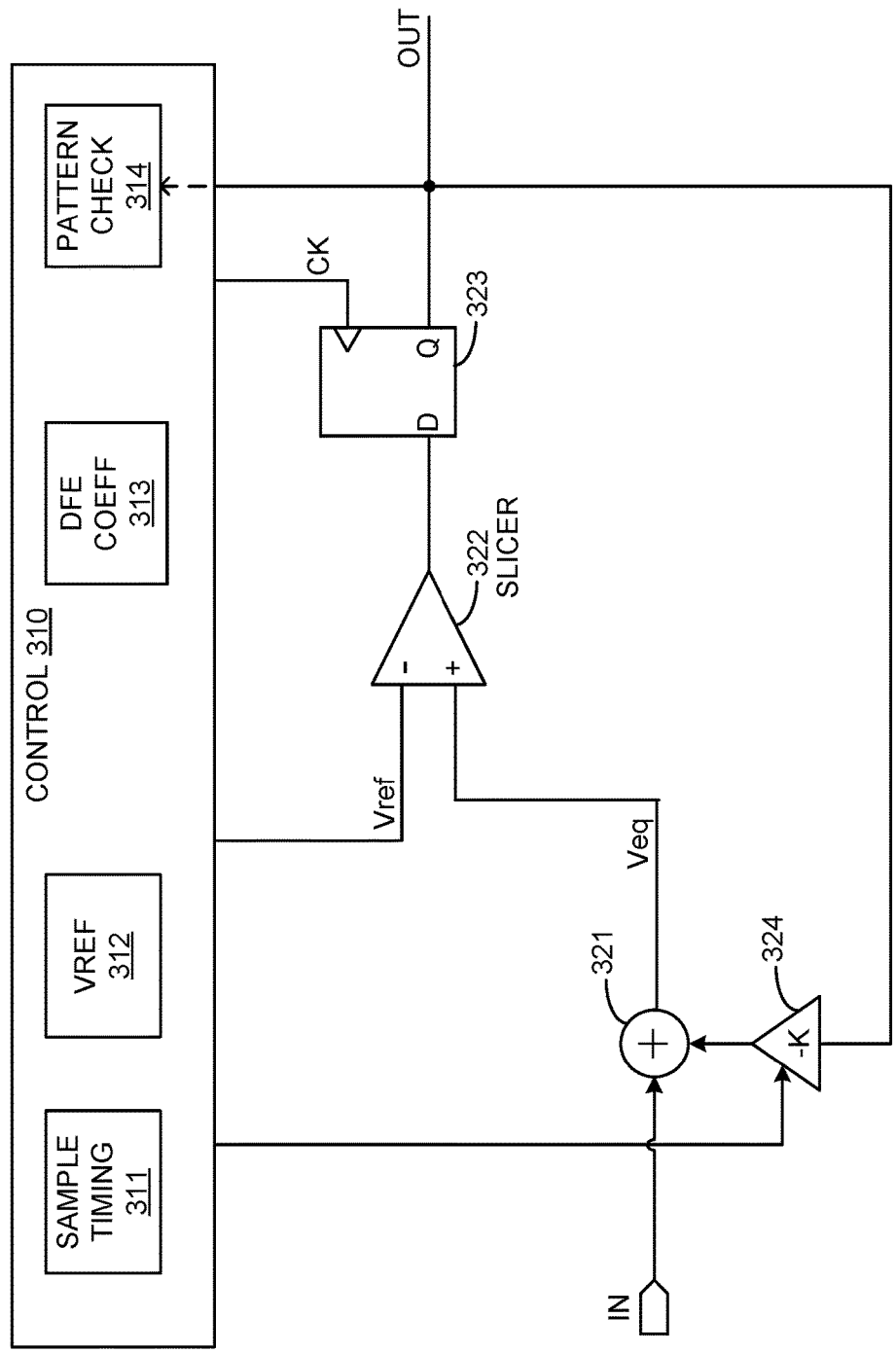
FIG. 3 illustrates a single-ended receiver with DFE.

FIG. 3 illustrates a single-ended receiver with DFE. Receiver 300, illustrated in FIG. 3, may correspond to one or more of receiver 150, receivers 214, and/or receivers 224. In an embodiment, receiver 300 may have DFE tap values and reference voltage that are trained as described herein.

Receiver 300 comprises control 310, summer 321, slicer (comparator) 322, sampler 323, and weighted feedback 324. Control 310 includes/maintains sample timing value 311, Vref value 312, DFE coefficient value 313. Control 310 includes pattern check 314. Sampler 323 outputs digital signals that can be interpreted to be either +1 or −1. Weighted feedback 324 receives a digital signal (interpreted as +1 or −1) and outputs analog signals that do not need interpretation.

Control 310 is operatively coupled to weighted feedback 324 to control the weighting (i.e., DFE coefficient K) applied by weighted feedback 324 to the output of sampler 323. Control maintains a DFE coefficient value 313 that determines the analog K value applied by weighted feedback 324. It should be understood that K (and DFE coefficient value 313) may be variable during an adaptation (i.e., training) period, but is typically constant during normal operation.

Control 310 is operatively coupled to the inverting input of slicer 322 to control the threshold voltage (Vref) of slicer 322. Control maintains a Vref value 312 that determines the analog Vref voltage applied to the inverting input of slicer 322. It should be understood that the Vref voltage (and Vref value 312) may be variable during an adaptation (i.e., training) period, but is typically constant during normal operation.

Control 310 is operatively coupled to the clock input port of sampler 323 to control the timing of the samples made by sampler 323. Control 310 receives the output of sampler 323. Control maintains a sample timing value 311 that determines the sample timing of sampler 323. It should be understood that sample timing (and sample timing value 311) may be variable during an adaptation (i.e., training) period, but is typically constant during normal operation.

An input signal (IN) is operatively coupled to an input of summer 321. The output of weighted feedback 324 is operatively coupled to another input of summer 321. The output of summer 321 (Veq) is operatively coupled to the non-inverting input of slicer 322. The output of sampler 323 is operatively coupled to the input of weighted feedback 324. Input signal (IN) may be received from, for example, interconnect system 140.

In an embodiment, control 310 measures, at a first value for sample timing value 311, and by varying DFE coefficient value 313, a first eye height while receiving a first expected data pattern at the input signal. This first data pattern may be transmitted to receiver 300 by, for example, driver 110. The received data pattern is considered 'expected' because it matches the pattern transmitted to receiver 300 (e.g., by driver 110). Control 310 measures the first eye height by sweeping DFE coefficient value and comparing, by pattern check 314, the results received from sampler 323. When pattern check 314 receives the first expected pattern from sampler 323, control 310 can conclude the DFE coefficient value 313 is resulting in a Veq that is within the eye. When pattern check 314 does not receive the first expected pattern from sampler 323, control 310 can conclude the DFE coefficient value 313 is resulting in a Veq that is not within the eye. Thus, sequential DFE coefficient 313 values that cause the sampler 323 output to transition from the expected pattern to a non-expected pattern (or vice versa) indicate the eye height boundaries. The first expected data pattern may high-frequency switching with respect to a number of DFE taps of receiver 300. For example, with the 1-tap DFE illustrated in FIG. 3, a data patterns to test the high-frequency switching may include the sequences of "1011" and/or "0100 to test for a high-frequency (a.k.a., AC) zero or one, respectively.

In an embodiment, control 310 measures, at the first value for sample timing value 311, and by varying DFE coefficient value 313, a second eye height while receiving a second expected data pattern at the input signal. This second data pattern may be transmitted to receiver 300 by, for example, driver 110. Control 310 measures the second eye height by sweeping DFE coefficient value and comparing, by pattern check 314, the results received from sampler 323. When pattern check 314 receives the second expected pattern from sampler 323, control 310 can conclude the DFE coefficient value 313 is resulting in a Veq that is within the eye. When pattern check 314 does not receive the second expected pattern from sampler 323, control 310 can conclude the DFE coefficient value 313 is resulting in a Veq that is not within the eye. Thus, sequential DFE coefficient 313 values that cause the sampler 323 output to transition from the expected pattern to a non-expected pattern (or vice versa) indicate the eye height boundaries. The second expected data pattern may low-frequency switching with respect to a number of DFE taps of receiver 300. For example, with the 1-tap DFE illustrated in FIG. 3, a data patterns to test the low-frequency switching may include the sequences of "1100" and/or "0011" to test for a low-frequency (a.k.a., DC) zero or one, respectively.

Based on the first eye height and the second eye height, control 310 adjusts DFE coefficient value 313 to a first setting. For example, control 310 may adjust DFE coefficient value 313 to an average of the DFE coefficient value 313 that resulted in the eye boundary when receiving the first expected pattern and the DFE coefficient value 313 that resulted in the eye boundary when receiving the second expected pattern. In this manner, the adjusted DFE coefficient value 313 is an attempt to equalize the first (high-frequency) and second (low-frequency) eye heights.

To further improve eye height, control 310 may adjust the reference voltage value 312 from the value used during measurements of the first eye height and the second eye height to a second value. For example, control 310 may offset reference voltage value 312 from the value used during the first and second eye height measurements. With the reference voltage value set to the second value, control 310 may then measure a third eye height while receiving the first expected data pattern at the input signal. With the reference voltage value set to the second value, control 310 may then also measure a fourth eye height while receiving the second expected data pattern at the input signal.

Control 310 may then determine whether a first difference between the first eye height and the second eye height is greater than a second difference between the third eye height and the fourth eye height. The first and second differences indicate whether the last reference voltage value 312 resulted in a maximum eye height. In other words, if the eye height starts getting smaller as the reference voltage value 312 is being swept, the location of the current reference voltage value 312 has passed the peak of the Vref vs. eye height curve. Thus, based on the first difference being greater than the second difference, control 310 adjusts the reference voltage value 312 of the slicer back to the previous value so that the reference voltage value 312 selected is at the peak of the Vref vs. eye height curve.

Figure 4:
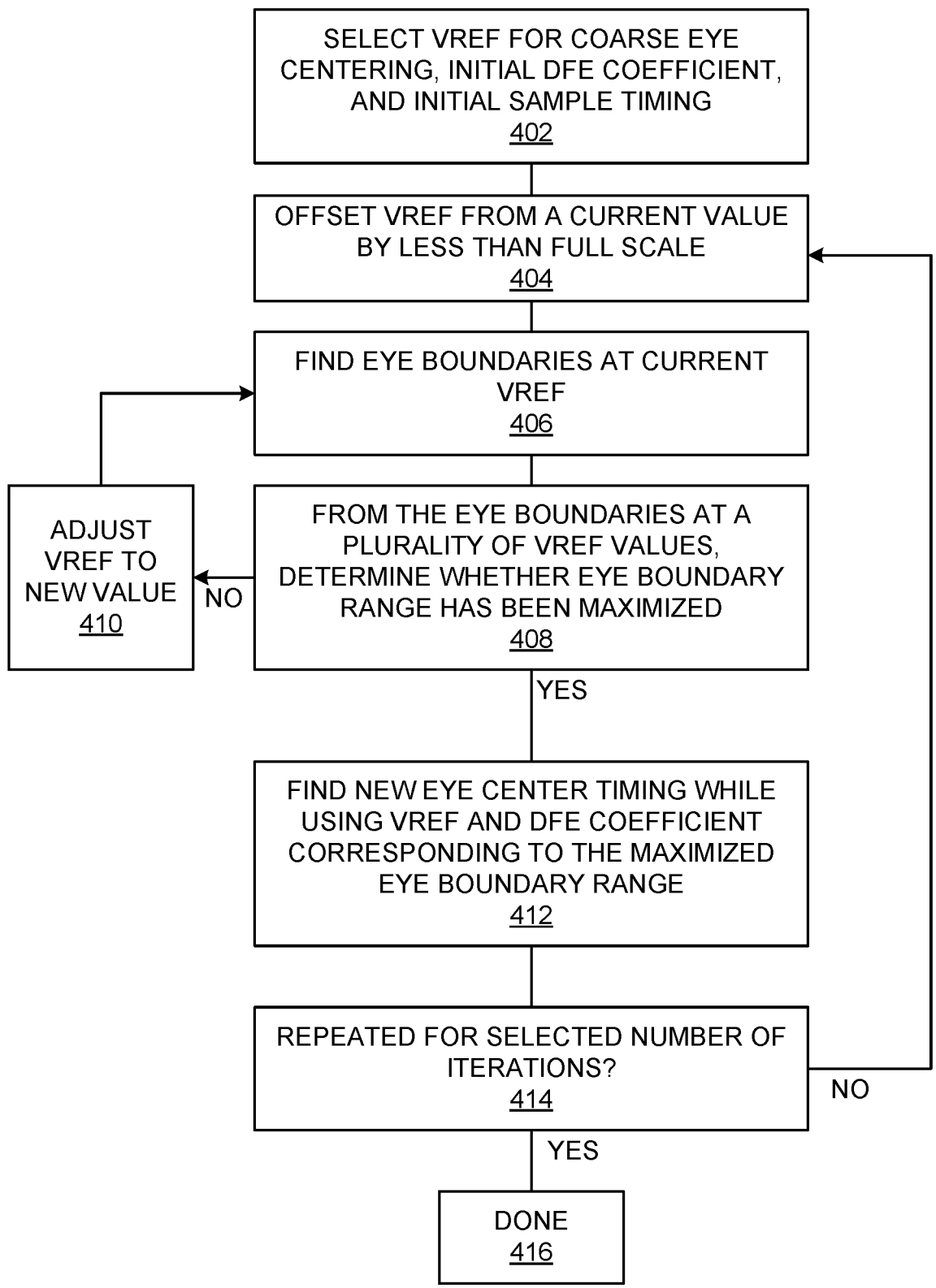
FIG. 4 is a flowchart illustrating a method of calibrating a receiver with DFE.

FIG. 4 is a flowchart illustrating a method of calibrating a receiver with DFE. One or more of the steps illustrated in FIG. 4 may be performed by, for example, communication system 100, memory system 200, receiver 300, and/or their components. A reference voltage (Vref) for coarse eye centering, initial DFE coefficient, and initial sample timing are selected (402). For example, control 310 may search, sweep and/or adjust reference voltage value 312 and/or an initial sample timing value 311 to values that can be used to find an initial DFE coefficient value 313 and then sweep and/or adjust DFE coefficient value 313 to accomplish a selected criteria (e.g., correct reception, minimize a characteristic, or maximize a characteristic).

The reference voltage (Vref) is offset from a current value by less than full scale (404). For example, if reference voltage value 312 may range from zero (0) to 255, reference voltage value 312 will not be offset in such a large amount as to reach zero or 255. Reference voltage value 312 may be offset by, for example, 5%, 10%, or 20%. Reference voltage value may be offset by, for example, a number of steps that is substantially smaller than the full scale or one-half of full scale value (e.g., 20 steps out of 256, 30 steps, etc.)

The eye boundaries at the current reference voltage are found (406). For example, control 310 may measure, with reference voltage value 312 held constant and by varying DFE coefficient value 313, a first eye height while receiving a first expected data pattern at the input signal and a second height while receiving a second expected data pattern at the input signal.

From the eye boundaries at a plurality of reference voltage (Vref) values, whether the eye boundary range has been maximized is determined (408). If it is determined that the maximum eye boundary range has not been reached, flow proceeds to box 410. If it is determined that the maximum eye boundary range has been reached, flow proceeds to box 412. For example, when the current reference voltage value 312 has passed the peak of the Vref vs. eye height curve, the eye height measured in box 406 will get smaller when compared to the eye height measured with the previous reference voltage value 312. Thus, based on the eye heights of two or more sequential reference voltage values 312, control 310 may determine whether the eye boundary range has been maximized.

A new eye center timing is found while using the reference voltage and DFE coefficient corresponding the maximized eye boundary range (412). For example, control 310 may search and/or sweep sample timing value 311 while holding reference voltage value 312 and DFE coefficient value 313 at their respective values that produced the maximum eye boundary range found by box 408.

Whether a selected number of iterations have been repeated is determined (414). If a selected number of iterations (e.g., N=10) have not been completed, flow proceeds back to box 404 where the reference voltage is again offset by less than full scale and a search for the peak of the Vref vs. eye height is repeated. If the selected number of iterations (e.g., N=10) have been completed, flow proceeds to box 416. In box 416, the process ends (416).

Figure 5:
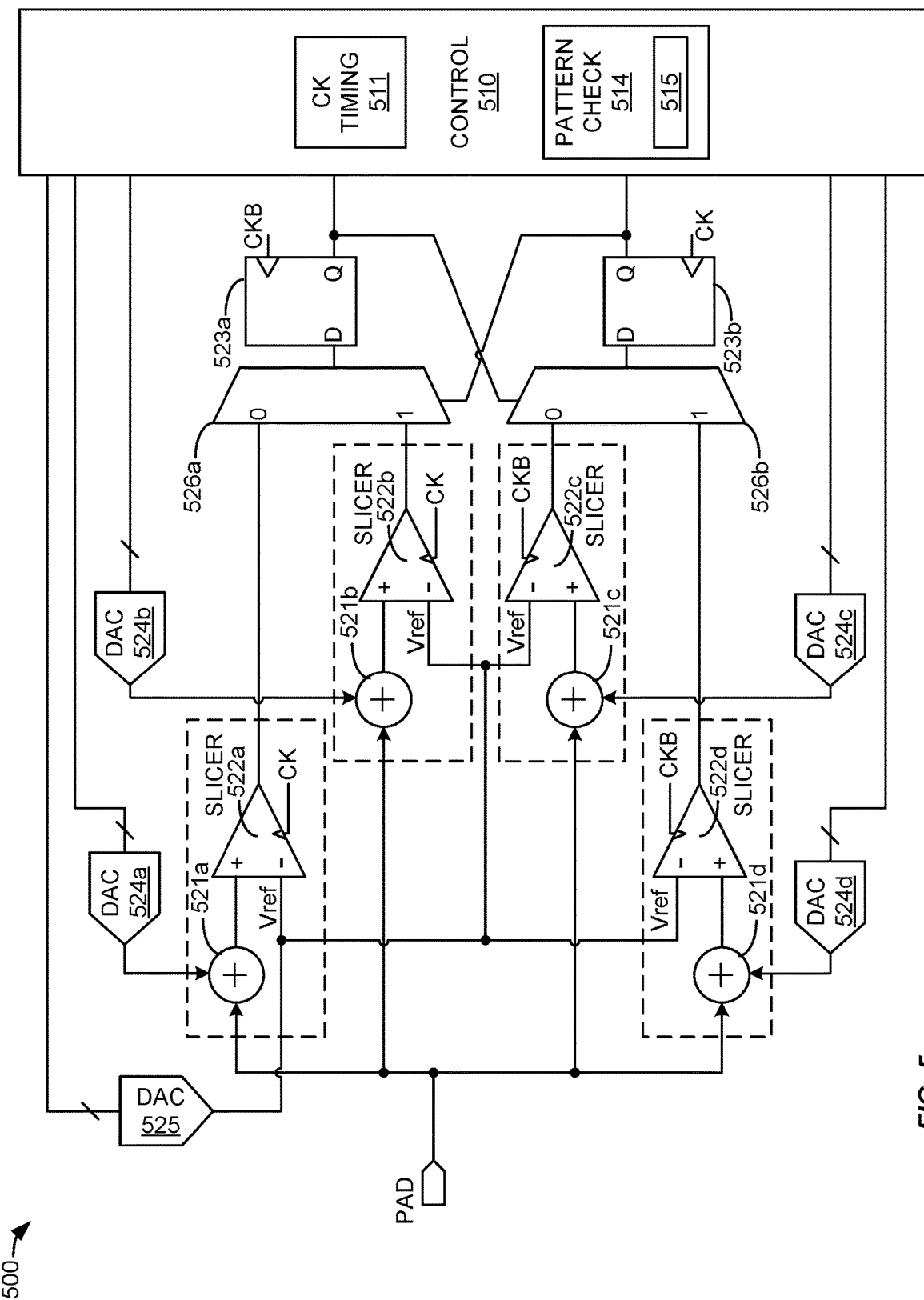
FIG. 5 illustrates a receiver with DFE and slicer offset compensation.

FIG. 5 illustrates a receiver with DFE and slicer offset compensation. In FIG. 5, receiver 500 comprises: control 510, summers 521a-521d, slicers (comparators) 522a-522d, latches 523a-523b, DFE digital-to-analog converters (DACs) 524a-524d, Vref DAC 525, and 2:1 multiplexors (MUXs) 526a-526b. Control 510 includes sample timing value 511 and pattern check 514. Pattern check 514 includes expected data pattern 515.

Control 510 is operatively coupled to control DFE DACs 524a-524d and Vref DAC 525. The analog voltage outputs of DFE DACs 524a-524d are operatively coupled respectively to a first input of summers 521a-521d. The second input of summers 521a-521d are operatively coupled to receive the input (PAD) to receiver 500. The outputs of summers 521a-521d are operatively coupled respectively to the non-inverting input of slicers 522a-522d. The inverting puts of slicers 522a-522d are operatively coupled to receive the analog voltage output of Vref DAC 525. Slicers 522a-522b are clocked by the clock signal CK. Slicers 522c-522d are clocked by the inverted clock signal CKB.

The output of slicer 522a is operatively coupled to the "0" input of MUX 526a. The output of slicer 522b is operatively coupled to the "1" input of MUX 526a. The output of slicer 522c is operatively coupled to the "0" input of MUX 526b. The output of slicer 522d is operatively coupled to the "1"

input of MUX 526b. The output of MUX 526a is operatively coupled to the data (D) input of latch 523a. The output of MUX 526b is operatively coupled to the D input of latch 523b. The output of latch 523a is provided to control 510 and the control input of MUX 526b. The output of latch 523b is provided to control 510 and the control input of MUX 526a. Latch 523a is clocked by the clock signal CK. Latch 523b is clocked by the inverted clock signal CKB.

It should be understood from FIG. 5 and the foregoing that receiver 500 samples the received voltage at PAD on both edges of CK. The rising edge of CK clocks slicer 522a and slicer 522b. The falling edge of CK (rising edge of CKB) clocks slicer 522c and slicer 522d. If the immediately previous symbol, as held by latch 523b is a "0", MUX 526a selects the output of slicer 522a to provide to latch 523a. If the immediately previous symbol, as held by latch 523b is a "1", MUX 526a selects the output of slicer 522b to provide to latch 523a. Similarly, if the immediately previous symbol, as held by latch 523a is a "0", MUX 526b selects the output of slicer 522c to provide to latch 523b. If the immediately previous symbol, as held by latch 523a is a "1", MUX 526b selects the output of slicer 522d to provide to latch 523a.

Thus, the DFE amount applied by DFE DAC 524a via summer 521a is used when the immediately previous symbol is a "0". The DFE amount applied by DFE DAC 524b via summer 521b is used when the immediately previous symbol is a "1". Similarly, the DFE amount applied by DFE DAC 524c via summer 521c is used when the immediately previous symbol is a "0". The DFE amount applied by DFE DAC 524d via summer 521d is used when the immediately previous symbol is a "1". The analog voltages output by DFE DACs 524a-524d may also include respective portions to compensate for offset voltages of slicers 522a-522d. t should be understood that the analog outputs of DFE DACs 524a-524d and the analog output of Vref DAC 525 may be variable during an adaptation (i.e., training) period, but are typically constant during normal operation.

In an embodiment, control 510 measures, at a first value for sample timing 511, and by varying the output voltages of DFE DACs 524a-524d, a first eye height while receiving a first expected data pattern 515 at the input signal. This first data pattern may be transmitted to receiver 500 by, for example, driver 110. The received data pattern is considered 'expected' because it matches the pattern transmitted to receiver 500 (e.g., by driver 110). Control 510 measures the first eye height by sweeping the output voltages of DFE DACs 524a-524d and comparing, by pattern check 514, the results received from latches 523a-523b. When pattern check 514 receives the first expected pattern from latches 523a-523b, control 510 can conclude the output voltages of DFE DACs 524a-524d is resulting in input voltages to slicers 522a-522d that are within the eye. When pattern check 514 does not receive the first expected pattern from latches 523a-523b, control 510 can conclude the output voltages of DFE DACs 524a-524d are resulting in slicers 522a-522d input voltages that is are within the eye. Thus, sequential digital input values to DFE DACs 524a-524d that cause the slicers 522a-522d outputs to transition from the expected pattern to a non-expected pattern (or vice versa) indicate the eye boundaries. The first expected data pattern may high-frequency switching with respect to a number of DFE taps of receiver 500. For example, with the 1-tap DFE illustrated in FIG. 5, a data patterns to test the high-frequency switching may include the sequences of "1011" and/or "0100 to test for a high-frequency (a.k.a., AC) zero or one, respectively.

In an embodiment, control 510 measures, at a first value for sample timing 511, and by varying the output voltages of DFE DACs 524a-524d, a second eye height while receiving a second expected data pattern 515 at the input signal. This second data pattern may be transmitted to receiver 500 by, for example, driver 110. Control 510 measures the second eye height by sweeping the output voltages of DFE DACs 524a-524d and comparing, by pattern check 514, the results received from latches 523a-523b. When pattern check 514 receives the second expected pattern from latches 523a-523b, control 310 can conclude the output voltages of DFE DACs 524a-524d are resulting in input voltages to slicers 522a-522d that are within the eye. When pattern check 514 does not receive the second expected pattern from latches 523a-523b, control 510 can conclude the output voltages of DFE DACs 524a-524d are resulting in input voltages to slicers 522a-522d that are not within the eye. Thus, sequential digital input values DFE DACs 524a-524d that cause the slicers 522a-522d outputs to transition from the expected pattern to a non-expected pattern (or vice versa) indicate the eye boundaries. The second expected data pattern may low-frequency switching with respect to a number of DFE taps of receiver 500. For example, with the 1-tap DFE illustrated in FIG. 5, a data patterns to test the low-frequency switching may include the sequences of "1100" and/or "0011" to test for a low-frequency (a.k.a., DC) zero or one, respectively.

Based on the first eye height and the second eye height, control 510 adjusts the output voltages of DFE DACs 524a-524d to a first set of settings. For example, control 510 may adjust the digital input values of DFE DACs 524a-524d to an average of the digital input values that resulted in the eye boundary when receiving the first expected pattern and the digital input values that resulted in the eye boundary when receiving the second expected pattern. In this manner the adjusted the digital input values can match the first and second eye heights.

To further improve eye height, control 510 may adjust the Vref output by Vref DAC 525 from the value used during measurements of the first eye height and the second eye height to a second value. For example, control 510 may offset the digital input value to Vref DAC 525 from the value used during the first and second eye height measurements. With the digital input value to Vref DAC 525 set to the second value, control 510 may then measure a third eye height while receiving the first expected data pattern at the input signal. With the digital input value to Vref DAC 525 set to the second value, control 510 may then also measure a fourth eye height while receiving the second expected data pattern at the input signal.

Control 510 may then determine whether a first difference between the first eye height and the second eye height is greater than a second difference between the third eye height and the fourth eye height. The first and second differences indicate whether the digital input value to Vref DAC 525 resulted in a maximum eye height. In other words, if the eye height starts getting smaller as the digital input value to Vref DAC 525 is being swept, the location of the current digital input value to Vref DAC 525 has passed the peak of the Vref vs. eye height curve. Thus, based on the first difference being greater than the second difference, control 510 adjusts the digital input value to Vref DAC 525 back to the previous value so that the digital input value to Vref DAC 525 selected is at the peak of the Vref vs. eye height curve.

FIG. 6 is a flowchart illustrating a method of adjusting a DFE coefficient. One or more of the steps illustrated in FIG. 6 may be performed by, for example, communication system 100, memory system 200, receiver 300, receiver 500, and/or their components. At a first sample timing and by varying a DFE coefficient of the receiver, a first eye height is measured while receiving a first data pattern (602). For example, control 510 may measure, at a first value for sample timing 511, and by varying the output voltages of DFE DACs 524a-524d, a first eye height while receiving a first expected data pattern 515 at the input signal. This first data pattern may be transmitted to receiver 500 by, for example, driver 110.

At the first sample timing and by varying the DFE coefficient of the receiver, a second eye height is measured while receiving a second data pattern (604). For example, control 510 may measure, at a first value for sample timing 511, and by varying the output voltages of DFE DACs 524a-524d, a second eye height while receiving a second expected data pattern 515 at the input signal. This second data pattern may be transmitted to receiver 500 by, for example, driver 110. Based on the first eye height and the second eye height, the DFE coefficient is adjusted to a first setting (606). For example, control 510 may adjust the digital input values of DFE DACs 524a-524d to an average of the digital input values that resulted in an eye boundary when receiving the first expected pattern and the digital input values that resulted in an eye boundary when receiving the second expected pattern.

FIG. 7 is a flowchart illustrating a method of calibrating receiver parameters. One or more of the steps illustrated in FIG. 7 may be performed by, for example, communication system 100, memory system 200, receiver 300, receiver 500, and/or their components. A first sample timing of a slicer that corresponds to a first eye center is found (702). For example, control 510 may find a clock timing 511 (and Vref) that corresponds to a two-dimensional center of the data eye while receiving an alternating pattern of 1's and 0's.

A first data pattern and second data pattern are provided to an input of the receiver (704). For example, driver 110 may transmit to the PAD node of receiver 500 a first data pattern and a second data pattern. The first data pattern may be a data pattern to test high-frequency switching and may include the sequences of "1011" and/or "0100 to test for a high-frequency (a.k.a., AC) zero or one, respectively. The second data pattern may be a data patterns to test low-frequency switching may include the sequences of "1100" and/or "0011" to test for a low-frequency (a.k.a., DC) zero or one, respectively.

A reference voltage of a slicer and a value of a DFE coefficient are swept iteratively to measure a plurality of first eye boundaries and a plurality of second eye boundaries corresponding to a plurality of reference voltage values (706). For example, control 510 may alternately adjust the digital inputs to Vref DAC 525 and sweep the digital inputs to DFE DACs 524a-524d to search for a peak in a Vref vs eye height curve. Based on the plurality of first eye boundaries and the plurality of second eye boundaries, a reference voltage value that maximizes a difference between a corresponding first eye boundary and a second eye boundary is determined (708). For example, based on the measured eye boundaries, control 510 may find a value for the digital inputs to Vref DAC 525 and values for the digital inputs to DFE DACs 524a-524d that lie at a peak in the Vref vs eye height curve.

While the receiver is using the reference voltage value that maximizes the difference between the corresponding first eye boundary and second eye boundary, a second sample timing of the slicer that corresponds to a second eye center is found (710). For example, control 510 may search and/or sweep sample timing value 511 while holding the digital inputs to Vref DAC 525 and DFE DACs 524a-524d at their respective values that produced the maximum eye boundary. The steps in boxes 704-710 are repeated for a number of iterations (712). For example, control 510 may iterate a set number (e.g., N) of times to find the final sample timing 511, and digital inputs to Vref DAC 525 and DFE DACs 524a-524d that maximize data eye height.

Figure 8:
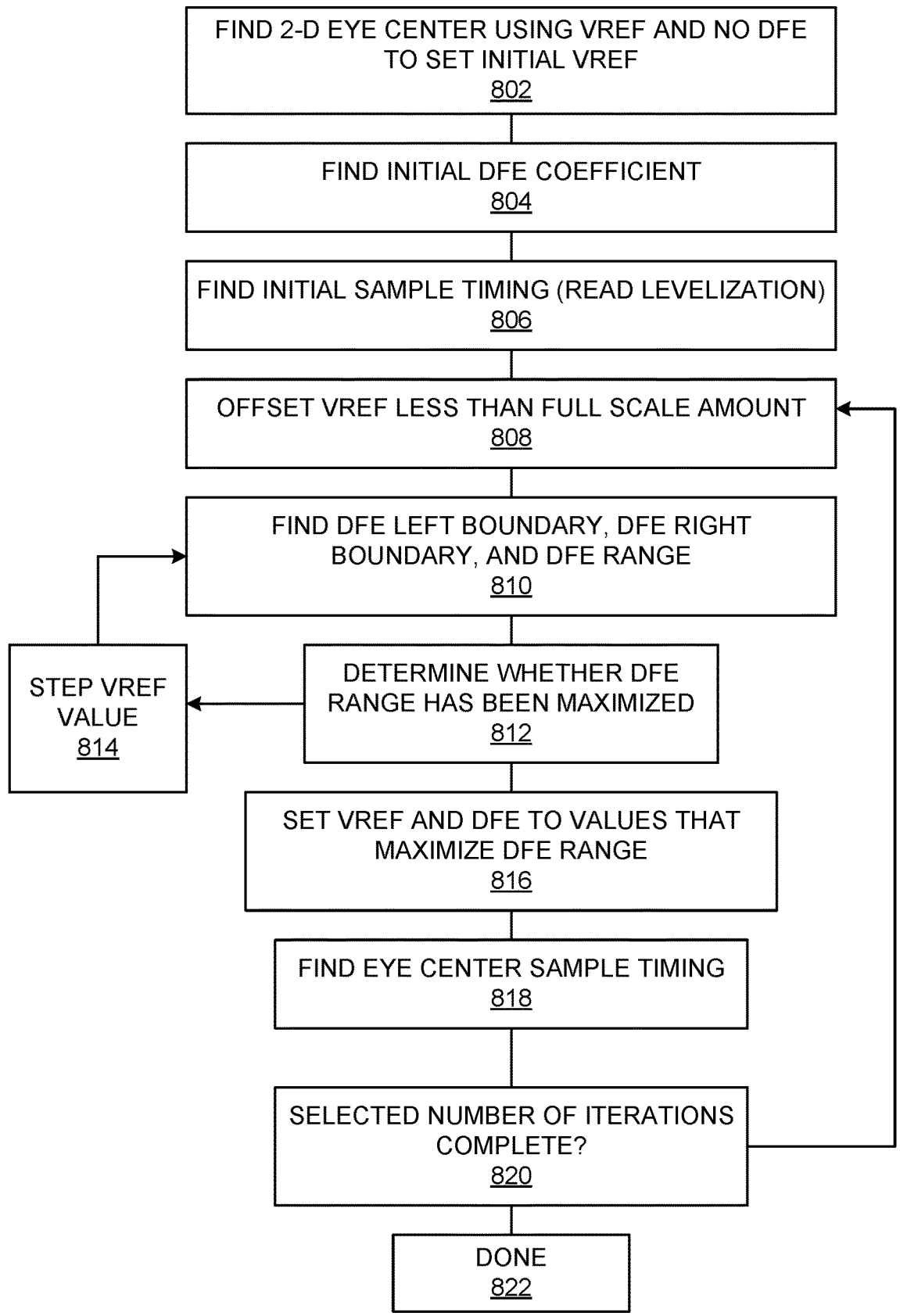
FIG. 8 is a flowchart illustrating a method of maximizing eye height.

FIG. 8 is a flowchart illustrating a method of maximizing eye height. One or more of the steps illustrated in FIG. 7 may be performed by, for example, communication system 100, memory system 200, receiver 300, receiver 500, and/or their components. To set an initial Vref, a 2-D eye center is found using no DFE (802). For example, control 510 may vary sample timing 511 and the digital inputs to Vref DAC 525 to find the center of the data eye in two dimensions (i.e., Vref and sample timing). This 2-D eye center may be found while receiver 500 is receiving an alternating pattern of 1's and 0's (e.g., " . . . 10101010 . . . ").

An initial DFE coefficient is found (804). For example, control 510 may find an initial value for the digital inputs to DFE DACs 524a-524d that correctly receives an alternating pattern of 1's and 0's (e.g., " . . . 10101010 . . . "). An initial sample timing is found (806). For example, control 510 may sweep or search for a sample timing 511 that correctly receives a pattern (e.g., " . . . 00010000 . . . ").

Vref is offset less than a full scale amount (808). For example, if the digital inputs to Vref DAC 525 may range from zero (0) to 255, the digital inputs to Vref DAC 525 may be offset in an amount that is not large enough as to reach zero or 255. the digital inputs to Vref DAC 525 may be offset by, for example, 5%, 10%, or 20%. the digital inputs to Vref DAC 525 may be offset by, for example, a number of steps that is substantially smaller than the full scale or one-half of full scale value (e.g., 20 steps out of 256, 30 steps, etc.)

A DFE left boundary, a DFE right boundary, and a DFE range are found (810). For example, control 510 may measure, with the digital inputs to Vref DAC 525 held constant and by varying the digital inputs to DFE DACs 524a-524d, a first eye height while receiving a first expected data pattern at the input signal and a second height while receiving a second expected data pattern at the input signal. Whether the DFE range has been maximized is found (812). If it is determined that the maximum eye boundary range has not been reached, flow proceeds to box 814. If it is determined that the maximum eye boundary range has been reached, flow proceeds to box 816. For example, when the digital input Vref DAC 525 have passed the peak of the Vref vs. eye height curve, the eye height measured in box 810 will get smaller when compared to the eye height measured with the previous digital input values to Vref DAC 525. Thus, based on the eye heights of two or more digital inputs to Vref DAC 525, control 510 may determine whether the eye boundary range has been maximized.

The Vref and DFE values are set to values that maximize the DFE range (816). For example, control 510 may set the digital inputs to Vref DAC 525 abd DFE DACs 524a-524d to their respective values that produced the maximum eye boundary range found by box 812. Eye center sample timing is found (818). For example, control 510 may search and/or sweep sample timing value 511 while holding the digital inputs to Vref DAC 525 abd DFE DACs 524a-524d at their respective values that produced the maximum eye boundary range found by box 812.

Whether a selected number of iterations have been completed is determined (820). If a selected number of iterations (e.g., N=10) have not been completed, flow proceeds back to box 808 where the reference voltage is again offset by less than full scale and a search for the peak of the Vref vs. eye height is repeated. If the selected number of iterations (e.g., N=10) have been completed, flow proceeds to box 822. In box 822, the process ends (822).

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of communication system 100, memory system 200, receiver 300, receiver 500, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
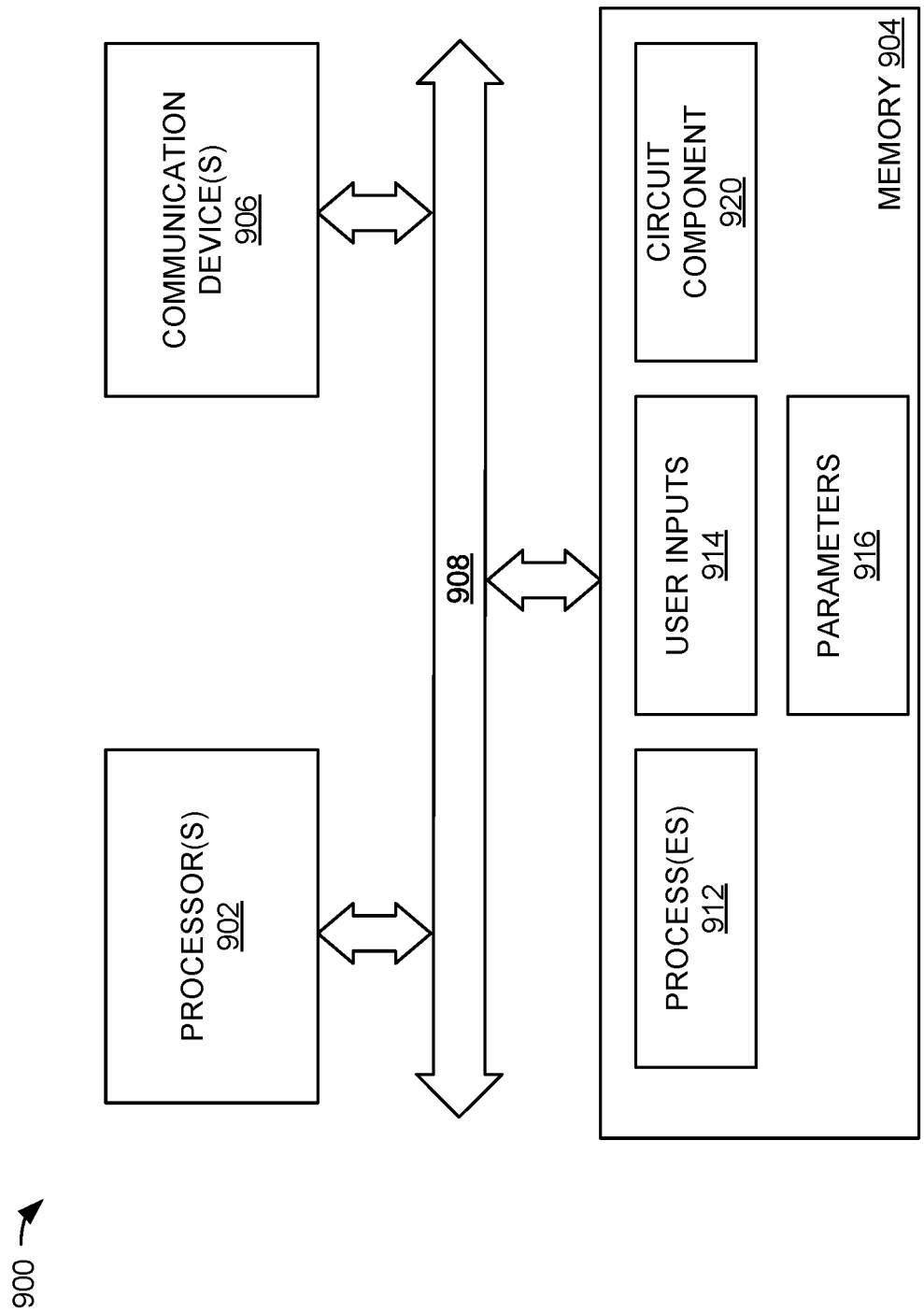
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of communication system 100, memory system 200, receiver 300, receiver 500, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A method of calibrating a receiver with decision feedback equalization (DFE), comprising: measuring, at a first sample timing and by varying a DFE coefficient of the receiver, a first eye height while receiving a first data pattern; measuring, at the first sample timing by varying the DFE coefficient, a second eye height while receiving a second data pattern; and, based on the first eye height and the second eye height, adjusting the DFE coefficient to a first setting.

Example 2: The method of example 1, wherein the first setting provides DFE that is a first average of the first eye height and the second eye height.

Example 3: The method of example 1, further comprising: adjusting a reference voltage of a slicer from a first value used during measurements of the first eye height and the second eye height to a second value; measuring, at the first sample timing, while using the second value, and by varying the DFE coefficient of the receiver, a third eye height while receiving the first data pattern; measuring, at the first sample timing, while using the second value, and by varying the DFE coefficient, a fourth eye height while receiving the second data pattern; determining whether a first difference between the first eye height and the second eye height is greater than a second difference between the third eye height and the fourth eye height.

Example 4: The method of example 3, further comprising: based on the first difference being greater than the second difference, adjusting the reference voltage of the slicer to the first value.

Example 5: The method of example 4, wherein, based on the first difference being greater than the second difference, the adjusting of the DFE coefficient to a first setting adjusts the DFE coefficient to provide DFE that is an average of the first eye height and the second eye height.

Example 6: The method of example 1, wherein the first data pattern has high-frequency switching with respect to a number of DFE taps of the DFE.

Example 7: The method of example 1, wherein the second data pattern has low-frequency switching with respect to a number of DFE taps of the DFE.

Example 8: An integrated circuit, comprising: a receiver circuit having a slicer and decision feedback equalization (DFE) circuitry, the DFE circuitry having a DFE coefficient, the slicer having a reference voltage; control circuitry configured to calibrate the DFE coefficient by: measuring, at a first sample timing and by varying the DFE coefficient, a first eye height while receiving a first data pattern; measuring, at the first sample timing by varying the DFE coefficient, a second eye height while receiving a second data pattern; and, based on the first eye height and the second eye height, adjusting the DFE coefficient to a first setting.

Example 9: The integrated circuit of example 8, wherein the first setting provides DFE that is a first average of the first eye height and the second eye height.

Example 10: The integrated circuit of example 8, wherein the control circuitry is further configured to: adjust a reference voltage of the slicer from a first value used during measurements of the first eye height and the second eye height to a second value; measure, at the first sample timing, while using the second value, and by varying the DFE coefficient of the receiver, a third eye height while receiving the first data pattern; measure, at the first sample timing, while using the second value, and by varying the DFE coefficient, a fourth eye height while receiving the second data pattern; determine whether a first difference between the first eye height and the second eye height is greater than a second difference between the third eye height and the fourth eye height.

Example 11: The integrated circuit of example 10, wherein the control circuitry is further configured to: based on the first difference being greater than the second difference, adjust the reference voltage of the slicer to the first value.

Example 12: The integrated circuit of example 11, wherein, based on the first difference being greater than the second difference, adjusting the DFE coefficient to a first setting adjusts the DFE coefficient to provide DFE that is an average of the first eye height and the second eye height.

Example 13: The integrated circuit of example 8, wherein the first data pattern has high-frequency switching with respect to a number of DFE taps of the DFE.

Example 14: The integrated circuit of example 8, wherein the second data pattern has low-frequency switching with respect to a number of DFE taps of the DFE.

Example 15: A method of calibrating a decision feedback equalization (DFE) coefficient of a receiver, comprising: (a) finding a first sample timing of a slicer that corresponds to a first eye center; (b) providing a first data pattern and a second data pattern to an input of the receiver; (c) iteratively varying a reference voltage of a slicer and sweeping a value of the DFE coefficient to measure a plurality of first eye boundaries and a plurality of second eye boundaries corresponding to a plurality of reference voltage values; (d) based on the plurality of first eye boundaries and the plurality of second eye boundaries, determining a reference voltage value that maximizes a difference between a corresponding first eye boundary and second eye boundary; (e) while the receiver is using the reference voltage value that maximizes the difference between the corresponding first eye boundary and second eye boundary, finding a second sample timing of the slicer that corresponds to a second eye center; (f) repeating steps (b) through (e) for a number of iterations.

Example 16: The method of example 15, wherein the first data pattern has high-frequency switching with respect to a number of DFE taps of the DFE.

Example 17: The method of example 15, wherein the second data pattern has low-frequency switching with respect to a number of DFE taps of the DFE.

Example 18: The method of example 15, further comprising: before finding the second sample timing adjusting a value of the DFE coefficient to a first setting the DFE coefficient to provide DFE that is an average of the corresponding first eye boundary and second eye boundary.

Example 19: The method of example 18, further comprising: before finding the first sample timing, providing a third data pattern to the input of the receiver.

Example 20: The method of example 19, further comprising: before finding the first sample timing, finding a first value of the DFE coefficient to be used when finding the first sample timing.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of calibrating a receiver with decision feedback equalization (DFE), comprising:
    measuring, at a first sample timing and by varying a DFE coefficient of the receiver, a first eye height while receiving a first data pattern;
    measuring, at the first sample timing by varying the DFE coefficient, a second eye height while receiving a second data pattern; and
    based on the first eye height and the second eye height, adjusting the DFE coefficient to a first setting.

2. The method of claim 1, wherein the first setting provides DFE that is a first average of the first eye height and the second eye height.

3. The method of claim 1, further comprising:
    adjusting a reference voltage of a slicer from a first value used during measurements of the first eye height and the second eye height to a second value;
    measuring, at the first sample timing, while using the second value, and by varying the DFE coefficient of the receiver, a third eye height while receiving the first data pattern;
    measuring, at the first sample timing, while using the second value, and by varying the DFE coefficient, a fourth eye height while receiving the second data pattern; and
    determining whether a first difference between the first eye height and the second eye height is greater than a second difference between the third eye height and the fourth eye height.

4. The method of claim 3, further comprising: based on the first difference being greater than the second difference, adjusting the reference voltage of the slicer to the first value.

5. The method of claim 4, wherein, based on the first difference being greater than the second difference, the adjusting of the DFE coefficient to the first setting adjusts the DFE coefficient to provide DFE that is an average of the first eye height and the second eye height.

6. The method of claim 1, wherein the first data pattern has high-frequency switching with respect to a number of DFE taps of the DFE.

7. The method of claim 1, wherein the second data pattern has low-frequency switching with respect to a number of DFE taps of the DFE.

8. An integrated circuit, comprising:
a receiver circuit having a slicer and decision feedback equalization (DFE) circuitry, the DFE circuitry having a DFE coefficient, the slicer having a reference voltage; and
control circuitry configured to calibrate the DFE coefficient by:
measuring, at a first sample timing and by varying the DFE coefficient, a first eye height while receiving a first data pattern;
measuring, at the first sample timing by varying the DFE coefficient, a second eye height while receiving a second data pattern; and
based on the first eye height and the second eye height, adjusting the DFE coefficient to a first setting.

9. The integrated circuit of claim 8, wherein the first setting provides DFE equalization that is a first average of the first eye height and the second eye height.

10. The integrated circuit of claim 8, wherein the control circuitry is further configured to:
adjust a reference voltage of the slicer from a first value used during measurements of the first eye height and the second eye height to a second value;
measure, at the first sample timing, while using the second value, and by varying the DFE coefficient of the receiver circuit, a third eye height while receiving the first data pattern;
measure, at the first sample timing, while using the second value, and by varying the DFE coefficient, a fourth eye height while receiving the second data pattern; and
determine whether a first difference between the first eye height and the second eye height is greater than a second difference between the third eye height and the fourth eye height.

11. The integrated circuit of claim 10, wherein the control circuitry is further configured to: based on the first difference being greater than the second difference, adjust the reference voltage of the slicer to the first value.

12. The integrated circuit of claim 11, wherein, based on the first difference being greater than the second difference, adjusting the DFE coefficient to the first setting adjusts the DFE coefficient to provide DFE that is an average of the first eye height and the second eye height.

13. The integrated circuit of claim 8, wherein the first data pattern has high-frequency switching with respect to a number of DFE taps of the DFE.

14. The integrated circuit of claim 8, wherein the second data pattern has low-frequency switching with respect to a number of DFE taps of the DFE.

15. A method of calibrating a decision feedback equalization (DFE) coefficient of a receiver, comprising:
(a) finding a first sample timing of a slicer that corresponds to a first eye center;
(b) providing a first data pattern and a second data pattern to an input of the receiver;
(c) iteratively varying a reference voltage of the slicer and sweeping a value of the DFE coefficient to measure a plurality of first eye boundaries and a plurality of second eye boundaries corresponding to a plurality of reference voltage values;
(d) based on the plurality of first eye boundaries and the plurality of second eye boundaries, determining a reference voltage value that maximizes a difference between a corresponding first eye boundary and second eye boundary;
(e) while the receiver is using the reference voltage value that maximizes the difference between the corresponding first eye boundary and second eye boundary, finding a second sample timing of the slicer that corresponds to a second eye center; and
(f) repeating steps (b) through (e) for a number of iterations.

16. The method of claim 15, wherein the first data pattern has high-frequency switching with respect to a number of DFE taps of the DFE.

17. The method of claim 15, wherein the second data pattern has low-frequency switching with respect to a number of DFE taps of the DFE.

18. The method of claim 15, further comprising:
before finding the second sample timing, adjusting a value of the DFE coefficient to a first setting the DFE coefficient to provide DFE that is an average of the corresponding first eye boundary and second eye boundary.

19. The method of claim 18, further comprising:
before finding the first sample timing, providing a third data pattern to the input of the receiver.

20. The method of claim 19, further comprising:
before finding the first sample timing, finding a first value of the DFE coefficient to be used when finding the first sample timing.

* * * * *